United States Patent [19]
Boxum

[11] Patent Number: 5,911,748
[45] Date of Patent: Jun. 15, 1999

[54] WATER SUPPLY LINE HEATER CONTROL FOR AN ICE MAKER IN A RECREATIONAL VEHICLE REFRIGERATOR

[75] Inventor: Bruce Boxum, Angola, Ind.

[73] Assignee: White Consolidated Industries, Inc., Cleveland, Ohio

[21] Appl. No.: 08/993,909

[22] Filed: Dec. 18, 1997

[51] Int. Cl.⁶ .................................................. B60H 1/32
[52] U.S. Cl. ................................ 62/244; 62/340; 392/468
[58] Field of Search ............................ 62/239, 244, 340; 392/468, 478, 480

[56] References Cited

U.S. PATENT DOCUMENTS

| | | | |
|---|---|---|---|
| 2,593,459 | 4/1952 | Johnson | 392/468 |
| 3,008,301 | 11/1961 | Baillif et al. | 62/135 |
| 3,120,600 | 2/1964 | True | 392/468 |
| 3,805,539 | 4/1974 | Burgel et al. | 62/148 |
| 3,835,661 | 9/1974 | Kochendorfer et al. | 62/340 |
| 3,921,414 | 11/1975 | Bright | 62/188 |
| 4,248,177 | 2/1981 | Peterson et al. | 392/468 |
| 4,372,279 | 2/1983 | Parks | 392/468 |
| 4,691,529 | 9/1987 | Blomberg et al. | 62/332 |
| 4,914,919 | 4/1990 | Walfridson et al. | 62/236 |
| 5,160,094 | 11/1992 | Willis et al. | 62/137 |
| 5,187,948 | 2/1993 | Frohbieter | 62/351 |
| 5,207,073 | 5/1993 | Maier-Laxhuber et al. | 62/269 |

Primary Examiner—William E. Tapolcai
Attorney, Agent, or Firm—Pearne, Gordon, McCoy & Granger LLP

[57] ABSTRACT

An ice maker water supply line is provided with a heater. The heater is controlled by a thermally operated switch. The temperature sensor of the switch senses ambient temperature and operates the heater to prevent freezing of the water supply line. The ice maker is provided in an absorption refrigerator in a recreational vehicle. The supply line runs up the back of the refrigerator in a passage for cooling air flow.

12 Claims, 1 Drawing Sheet

WATER SUPPLY LINE HEATER CONTROL FOR AN ICE MAKER IN A RECREATIONAL VEHICLE REFRIGERATOR

BACKGROUND OF THE INVENTION

This invention relates generally to the field of ice makers and specifically to a water supply line heater control system for an ice maker in a refrigerator.

Freezers and refrigerators provided with freezers are often provided with ice makers. A water supply line is connected to the ice maker and provides a controlled flow of water into a mold. The water is frozen in the mold and then ejected from the mold as a small block of ice. Because the water line is partly located in the freezer or close to the freezer, a heater can be provided near the water line outlet to prevent freezing of the water line, as described in U.S. Pat. No. 3,008,301 to Baillif. In some cases, a heater is used to heat the mold, thereby loosening the ice to facilitate ejection, as described in Baillif and U.S. Pat. No. 5,160,094 to Willis.

Refrigerators with ice makers are sometimes installed in recreational vehicles. Typically, these are absorption type refrigerators powered by the vehicle's electrical system and using LP gas. The water supply line to the ice maker is tapped off of the main vehicle water supply. When the ambient temperature is near or below freezing, water in the water line may freeze or be so cold that it freezes before reaching the inlet to the ice maker.

BRIEF SUMMARY OF THE INVENTION

The present invention provides an ice making system including an ice maker and a water supply line connected to supply water to the ice maker. A heater is disposed for heating the water supply line and a power supply is connected to power the heater. A heater switch is connected to control power to the heater. A temperature sensor is connected to operate the switch, the sensor being disposed so as to sense ambient temperature.

The switch and sensor are a unitary thermally operated switch. The ice maker is disposed in the freezer compartment of a refrigeration system. The heater is disposed for heating a portion of the water supply line that is external to the freezer compartment. The sensor is located externally of the freezer compartment. An air passage provides cooling air to the refrigeration system and the water supply line is disposed in the air passage. The sensor is located in the air passage upstream of the water supply line. The refrigeration system is disposed in a movable vehicle and the air passage communicates with air external to the vehicle. The sensor is disposed for sensing the temperature of air external to the vehicle. The sensor is disposed at an intake of the air passage. The heater switch is connected in series with a main switch controlling power to the refrigeration system. A main switch controls power to the ice maker and a power switch is connected in series with the heater switch. The power switch is operatively linked to the main switch such that the heater is disabled when the main switch disconnects power to the refrigerator.

DESCRIPTION OF THE INVENTION

Figure 1:
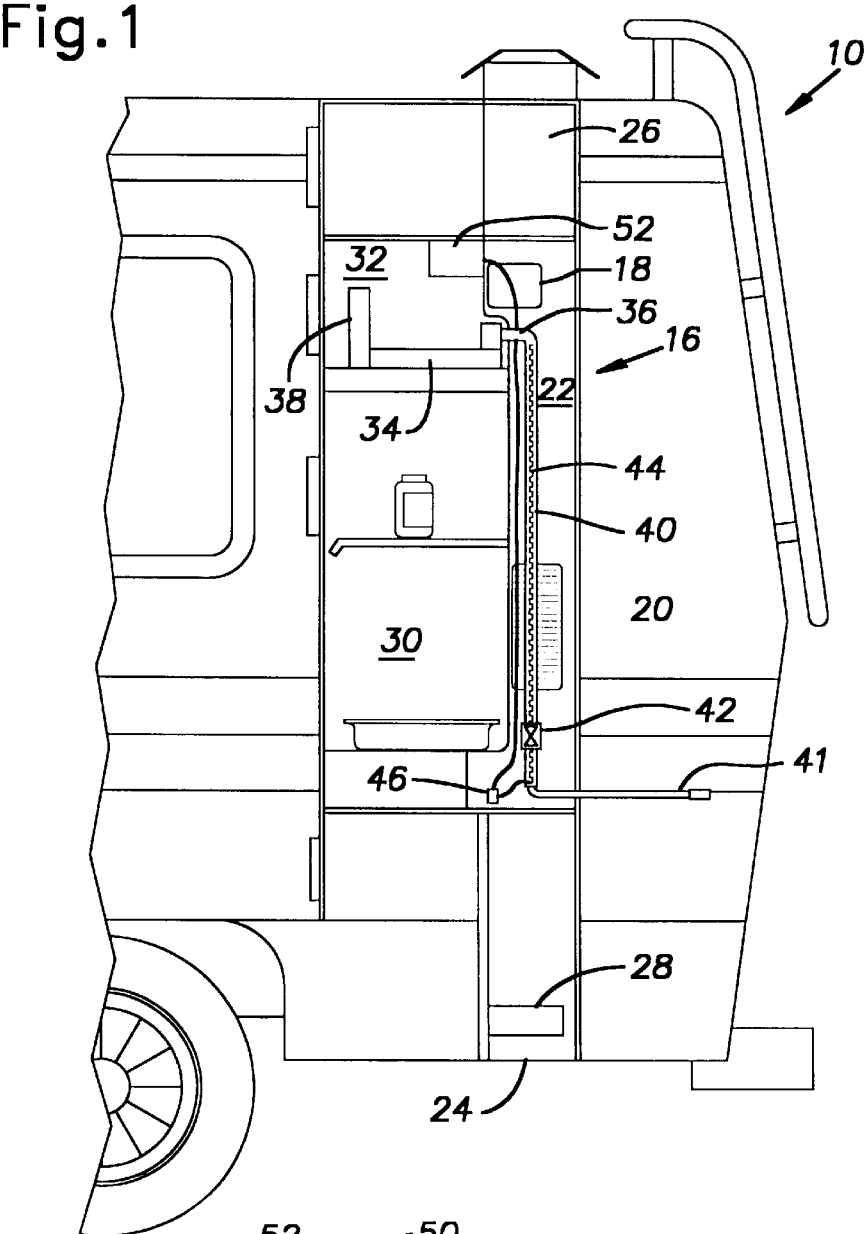
FIG. 1 shows a partially cut away side elevation view of a recreational vehicle having a refrigerator according to the invention.

Referring to FIG. 1, a recreational vehicle 10 has a refrigerator 16 installed therein. Preferably, the refrigerator 16 is an absorption type having a condenser 18 and an absorber 20. The condenser 18 and absorber 20 are cooled by airflow through an air passage 22 along the back of the refrigerator 16. The air passage 22 has an air intake 24 that communicates with ambient air outside the vehicle 10 or another source of cooling air. After cooling the condenser and absorber, the air exits through an air exhaust 26. As shown, the air intake 24 is through the floor of the vehicle and the exhaust is through the roof. The invention, however, is suitable in other air passage configurations. For example, the intake and exhaust can be located through sidewalls of the vehicle, as is common. Airflow can be enhanced by a fan 28.

The refrigerator has a refrigeration compartment 30 and a freezer compartment 32, each being accessible through a corresponding door. An ice maker 34 is provided in the freezer compartment 32 and includes molds (not shown) for forming blocks of ice and an ejection apparatus (not shown) for ejecting the ice blocks from the molds. An ice maker water inlet tube 36 projects rearwardly from the freezer compartment 32. Other structural details and features may also be provided, such as a timer, fill cup and mounting apparatus. A controller 38 controls operation of various components of the ice maker.

The vehicle 10 is provided with a water supply, such as a water tank (not shown). An ice maker water supply line 40 is connected to the water supply through and appropriate distribution system. As shown, the supply line 40 runs down the back of the refrigerator, inside the air passage 22, to a convenient water source connection 41 to the vehicle water supply. A solenoid controlled inlet valve 42 is connected in the supply line 40. The valve 42 can be provided at any point along the supply line 40 as dictated by cost effectiveness and space availability. The controller 38 is connected to operate the inlet valve 42 to provide water to the ice maker 34 as needed.

A heater 44 is provided adjacent the supply line 40. The heater 44 is preferably an electrical resistance heater, such as a positive temperature coefficient (PTC) heater. The heater 44 can be attached to the supply line 40 by any suitable means such as tape or by wrapping the heater on the supply line. For example, the heater 44 can be a commercially available heat strip that includes a resistive element enclosed in a flexible tape having a pressure sensitive adhesive on one side. The heater 44 is mounted to the supply line 40 where the supply line runs through the air passage 22 and other locations where the supply line is exposed to cold air that might freeze the water in the supply line. The heater can also be located adjacent the inlet valve 42 and part of the vehicle water source 41 when these are exposed to cold air.

Figure 2:
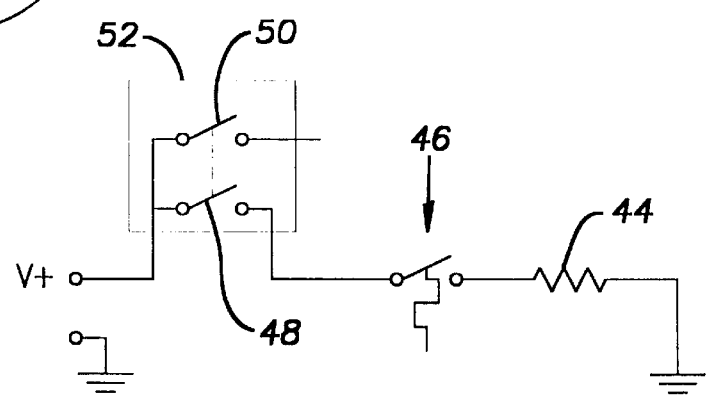
FIG. 2 is a schematic diagram of a control circuit according to the invention.

Referring to FIG. 2, the heater 44 is connected in a control circuit providing power to the heater. A thermal switch 46 is connected to operate the heater and includes an electrical switching mechanism and a temperature sensor that operates the switching mechanism. The thermal switch 46 is preferably a normally open switch that closes when the temperature falls below a certain level, such as 32° F. (0° C.). The thermal switch 46 is connected in series with a power switch 48. The power switch 48 is linked to a main on/off switch 50 associated with a refrigerator control module 52 of the refrigerator so that the power switch is closed only when the refrigerator is turned on. The on/off switch 50 can also be linked to a switch that controls power to the ice maker 34.

The heater is powered by the power supplied to the refrigerator from the vehicle power distribution system, such as a battery used for powering various accessories on the vehicle. Normally, the ice maker is powered by a 115 VAC supply and the refrigerator is powered by both the battery and 115 VAC supply. Thus, the heater power switch can be linked to the switch controlling battery power, as shown, or to a switch controlling AC power.

Referring to FIGS. 1 and 2, the thermal switch 46 is located in the air passage 22 so that the thermal switch senses the temperature of air entering through the intake 24. This location is upstream of the waterline in the airflow through the passage. Several alternative locations for the thermal switch would be suitable. The thermal switch, however, should be located so that it gives an indication of the temperature of the ambient air flowing over the supply line 40. For example, the thermal switch can be located on the vehicle exterior, at the air intake 24, or at the water supply line 40. When the thermal switch is located at the water supply line, the thermal switch can sense the temperature of the water so as to indicate when the water is at or near the freezing point. The thermal switch 46 can comprise a temperature sensor connected to remotely operate a switch. The sensor could then be located in the air passage 22 and the switch located in the control module 52 or in the heater 44.

In operation, the refrigerator is connected to an unswitched power supply of the vehicle. When the refrigerator is not operational, the on/off switch 50 is open and the heater power switch is open, thereby disabling the heater 44. If the on/off switch is closed to turn on the refrigerator, the heater power switch 48 closes to enable the heater 44. When enabled, operation of the heater is controlled by the thermal switch 46. The thermal switch 46 normally remains open, but closes to energize the heater 44 when the ambient air temperature is low enough that freezing of the water in the supply line 40 and/or inlet valve 42 might occur. When energized, the heater 44 heats the water sufficiently to prevent freezing.

The present disclosure describes several embodiments of the invention, however, the invention is not limited to these embodiments. Other variations are contemplated to be within the spirit and scope of the invention and appended claims.

I claim:

1. An ice making system comprising:

an ice maker;

a water supply line connected to supply water to the ice maker;

a heater disposed for heating the water supply line;

a power supply connected to power the heater;

a heater switch connected to control power to the heater; and a temperature sensor connected to operate the switch, the sensor being disposed so as to sense ambient temperature.

2. An ice making system according to claim 1, wherein the switch and sensor comprise a unitary thermally operated switch.

3. An ice making system according to claim 1, further comprising a refrigeration system having a freezer compartment, the ice maker being disposed in the freezer compartment and the heater being disposed for heating a portion of the water supply line that is external to the freezer compartment.

4. An ice making system according to claim 3, wherein the sensor is located externally of the freezer compartment.

5. An ice making system according to claim 3, further comprising an air passage for providing cooling air to the refrigeration system wherein the water supply line is disposed in the air passage.

6. An ice making system according to claim 5, wherein the sensor is located in the air passage upstream of the water supply line.

7. An ice making system according to claim 5, further comprising a movable vehicle, wherein the refrigeration system is disposed in the vehicle and the air passage communicates with air external to the vehicle.

8. An ice making system according to claim 7, wherein the sensor is disposed for sensing the temperature of air external to the vehicle.

9. An ice making system according to claim 8, wherein the sensor is disposed at an intake of the air passage.

10. An ice making system according to claim 3, wherein the heater switch is connected in series with a main switch controlling power to the refrigeration system.

11. An ice making machine according to claim 1, further comprising a main switch controlling power to the ice maker and a power switch connected in series with the heater switch, wherein the power switch is operatively linked to the main switch such that the heater is disabled when the main switch disconnects power to the refrigerator.

12. An ice making system comprising:

a movable vehicle;

an air passage;

an air intake communicating the air passage with ambient air;

a refrigerator in the vehicle having a freezer compartment an absorber and a condenser, the air passage providing for a flow of air over the condenser and absorber;

an ice maker located in the freezer compartment;

a water supply line connected to supply water to the ice maker and disposed at least partially in the air passage;

a heater disposed to heat at least part of the water supply line that is external to the freezer compartment;

a power supply connected to power the heater and refrigerator;

a main power switch connected to disconnect the power from the refrigerator;

a heater power switch connected to disconnect the power from the heater and linked to the main power switch so as to be open when the main power switch is open;

a control switch connected to control power to the heater when the heater power switch is closed; and a temperature sensor connected to operate the control switch, the sensor being mounted in the air passage so as to sense ambient temperature.

* * * * *

(12) REEXAMINATION CERTIFICATE (4575th)
United States Patent
Boxum

(10) Number: US 5,911,748 C1
(45) Certificate Issued: May 14, 2002

(54) WATER SUPPLY LINE HEATER CONTROL FOR AN ICE MAKER IN A RECREATIONAL VEHICLE REFRIGERATOR

(75) Inventor: Bruce Boxum, Angola, IN (US)

(73) Assignee: White Consolidated Industries, Inc., Cleveland, OH (US)

Reexamination Request:
No. 90/005,843, Oct. 11, 2000

Reexamination Certificate for:
Patent No.: 5,911,748
Issued: Jun. 15, 1999
Appl. No.: 08/993,909
Filed: Dec. 18, 1997

(51) Int. Cl.$^7$ .................................................. B60H 1/32
(52) U.S. Cl. ............................ 62/244; 62/340; 392/468
(58) Field of Search .................... 62/244, 340; 392/468, 392/479, 480; 219/535

(56) References Cited

U.S. PATENT DOCUMENTS 2,464,052 A * 3/1949 Numrich ..................... 219/535
3,364,337 A * 1/1968 Kahn .......................... 219/535
4,859,834 A * 8/1989 Hausler et al. ............. 392/480

OTHER PUBLICATIONS

Dometic 3106868.007 Ice Maker Heater Kit Installation Instructions. Form No. 3106860.004. Mar. 1996. DOM 000103.
Dometic 3106868.007 Ice Maker Heater Kit Installation Instructions. Form No. 31068680.004. Mar. 1996. DOM 000428.
Dometic 3106868.007 Ice Maker Heater Kit Installation Instructions. Form No. 3106860.004. Mar. 1996. DOM 000429.

* cited by examiner

*Primary Examiner*—Ronald C. Capossela

(57) ABSTRACT

An ice maker water supply line is provided with a heater. The heater is controlled by a thermally operated switch. The temperature sensor of the switch senses ambient temperature and operates the heater to prevent freezing of the water supply line. The ice maker is provided in an absorption refrigerator in a recreational vehicle. The supply line runs up the back of the refrigerator in a passage for cooling air flow.

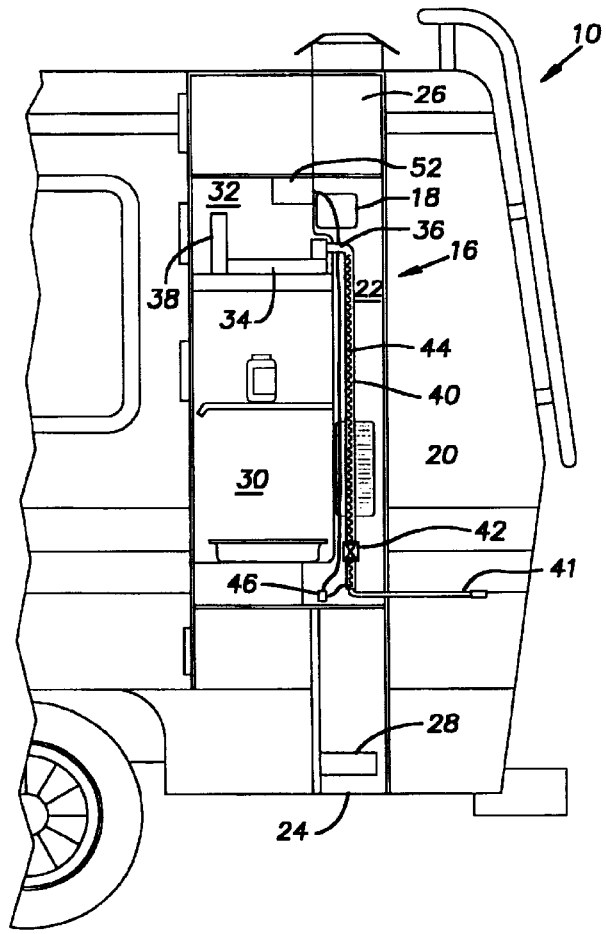

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claim 12 is confirmed.

Claims 1 and 3 are cancelled.
Claims 2, 4, 5, 10 and 11 are determined to be patentable as amended.
Claims 6–9, dependent on an amended claim, are determined to be patentable.
New claims 13–22 are added and determined to be patentable.

2. An ice making system according to claim [1] *5*, wherein the switch and sensor comprise a unitary thermally operated switch.

4. An ice making system according to claim [3] *5*, wherein the sensor is located externally of the freezer compartment.

5. An ice making system [according to claim 3, further] *comprising:*
   *a refrigeration system having a freezer compartment,*
   *an air passage for providing cooling air to the refrigeration system* [wherein]*;*
   *an ice maker disposed in the freezer compartment;*
   a water supply line connected to supply water to the ice maker, the water supply line [is] *being* disposed in the air passage*;*
   *a heater disposed for heating a portion of the water supply line that is external to the freezer compartment;*
   *a power supply connected to power the heater;*
   *a heater switch connected to control power to the heater; and*
   *a temperature sensor connected to operate the switch, the sensor being disposed so as to sense ambient temperature.*

10. An ice making system [according to claim 3, wherein] *comprising:*
    *an ice maker;*
    *a water supply line connected to supply water to the ice maker;*
    *a heater disposed for heating the water supply line;*
    *a power supply connected to power the heater;*
    a heater switch connected to control power to the heater, the heater switch [is] *being* connected in series with a main switch controlling power to the refrigeration system*;*
    *a temperature sensor connected to operate the switch, the sensor being disposed so as to sense ambient temperature; and*
    *a refrigeration system having a freezer compartment, the ice maker being disposed in the freezer compartment and the heater being disposed for heating a portion of the water supply line that is external to the freezer compartment.*

11. An ice making [according to claim 1, further] *system comprising:*
    *an ice maker;*
    *a water supply line connected to supply water to the ice maker;*
    *a heater disposed for heating the water supply line;*
    *a power supply connected to power the heater;*
    *a heater switch connected to control power to the heater;*
    *a temperature sensor connected to operate the switch, the sensor being disposed so as to sense ambient temperature;*
    *a main switch controlling power to the ice maker;* and
    a power switch connected in series with the heater switch, wherein the power switch is operatively linked to the main switch such that the heater is disabled when the main switch disconnects power to the refrigerator.

*13. An ice making system according to claim 5, wherein the temperature sensor is located within the air passage.*

*14. An ice making system according to claim 5, wherein the air passage has an air intake and an air exhaust, and wherein the temperature sensor is located within the air passage closer to the intake than to the exhaust.*

*15. An ice making system according to claim 5, wherein the refrigeration system has an absorber, wherein the air passage has an air intake, and wherein the temperature sensor is located within the air passage between the intake and the absorber.*

*16. An ice making system according to claim 5, wherein the refrigeration system has an absorber and a condenser, and wherein the temperature sensor is located within the air passage closer to the absorber than to the condenser.*

*17. An ice making system according to claim 5, wherein the air passage has an air intake, and wherein the temperature sensor is located within the air passage between the air intake and a connection of the water supply line and the ice maker.*

*18. An ice making system according to claim 5, wherein the air passage has an air intake, wherein the water supply line has an inlet valve, and wherein the temperature sensor is located within the air passage between the air intake and the inlet valve.*

*19. An ice making system according to claim 5, wherein the air passage has an air intake, and wherein the temperature sensor is located within the air passage between the air intake and the water supply line.*

*20. An ice making system according to claim 5, wherein the water supply line is connected to a water source, and wherein the temperature sensor is located within the air passage between the water source and a connection of the water supply line and the ice maker.*

*21. An ice making system according to claim 5, further comprising a main switch controlling power to the ice maker and the heater.*

*22. An ice making system according to claim 5, wherein the heater heats a portion of the water line that is disposed within the air passage.*

* * * * *